Aug. 9, 1938.　　　　　E. W. MILLER　　　　　2,126,339
GEAR SHAPING MACHINE WITH SWIVELED CUTTER SADDLE SUPPORT
Filed Oct. 24, 1936　　　　8 Sheets-Sheet 6
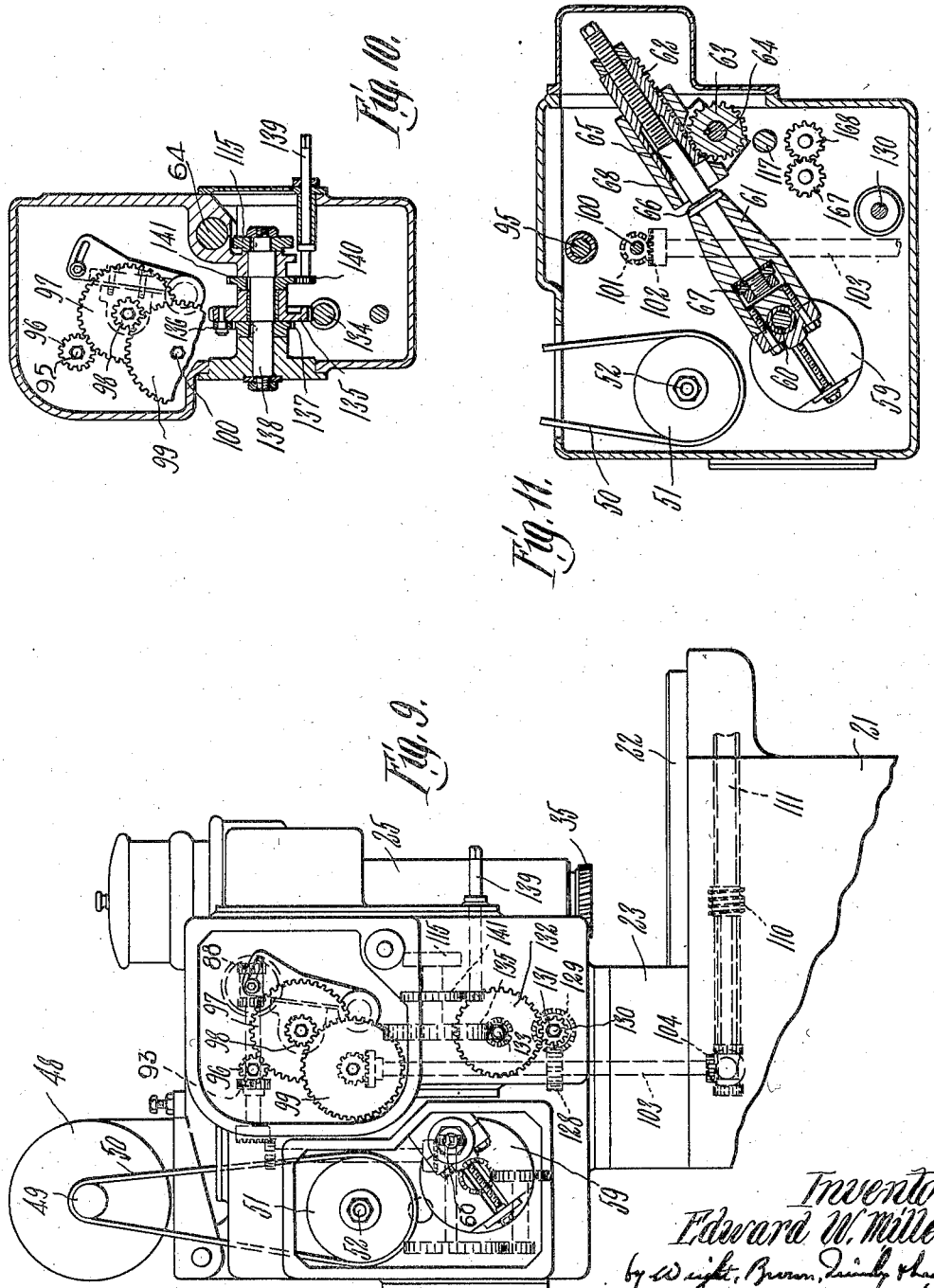

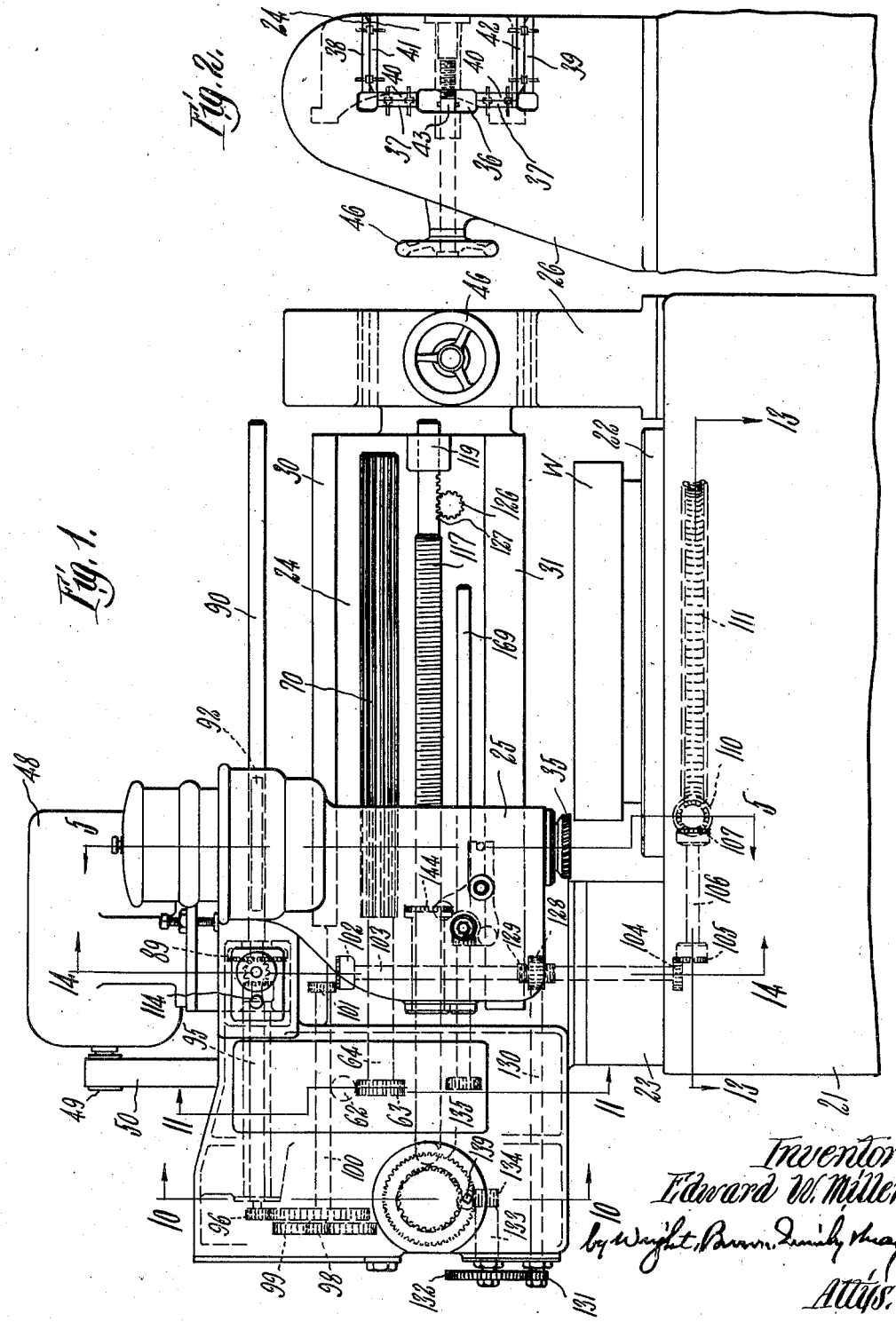

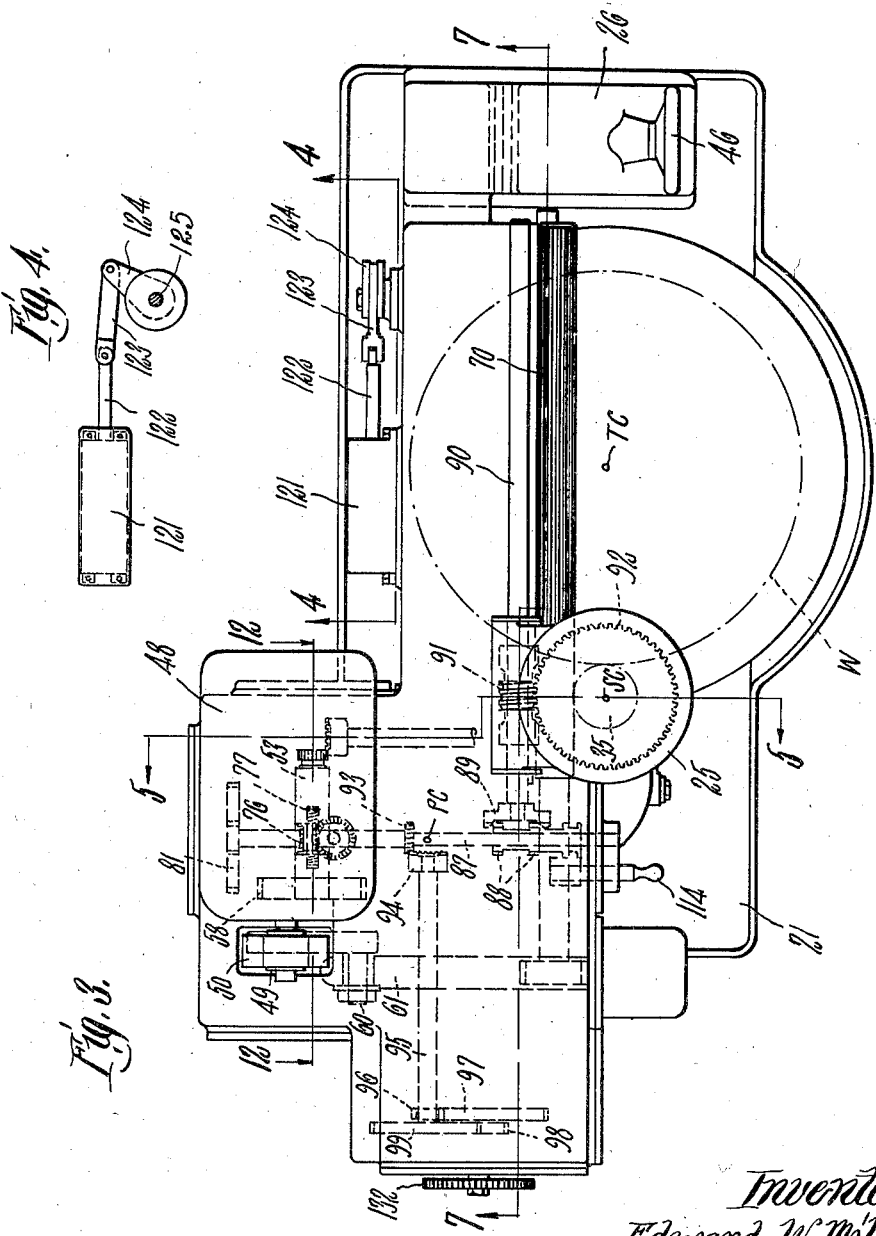

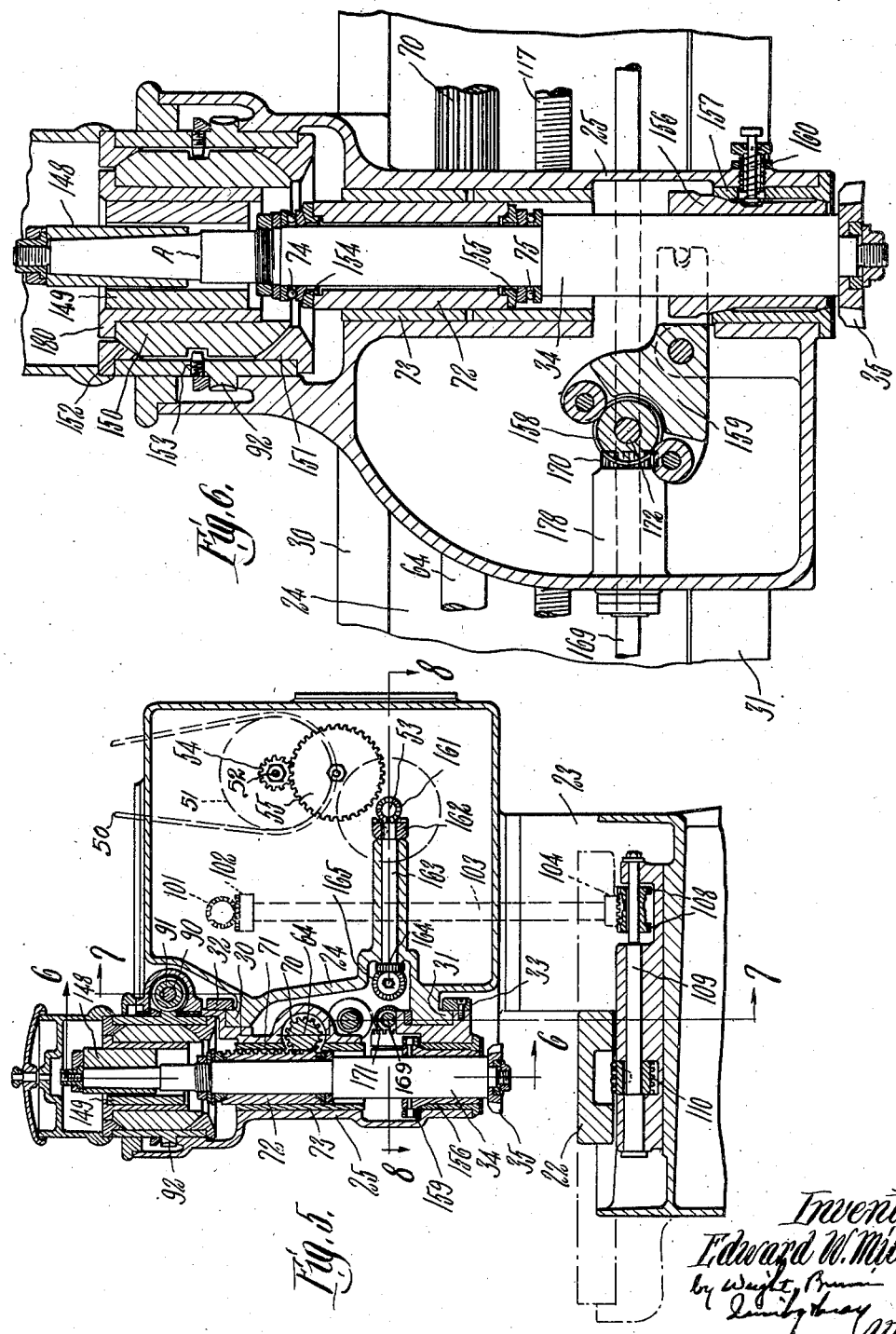

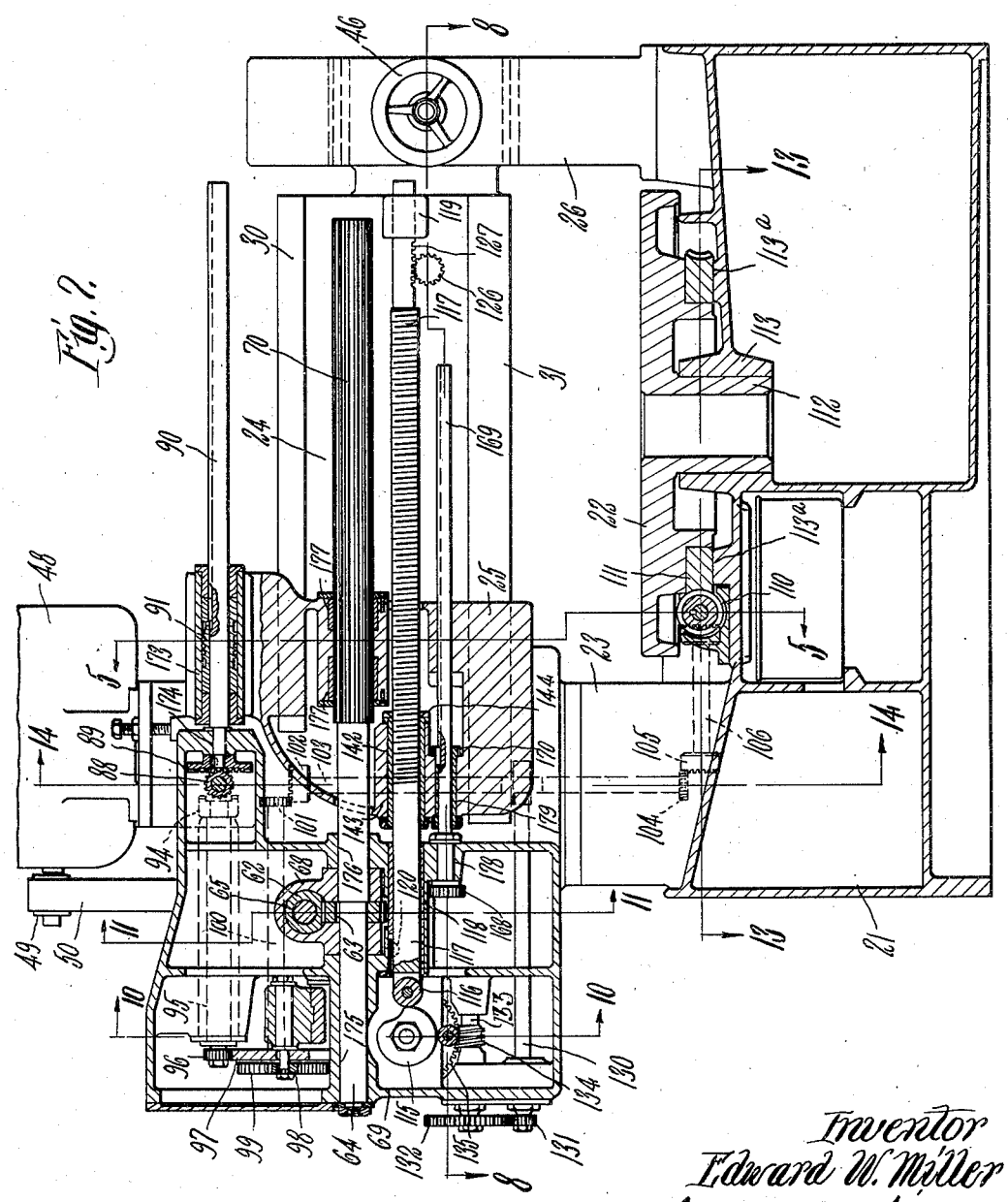

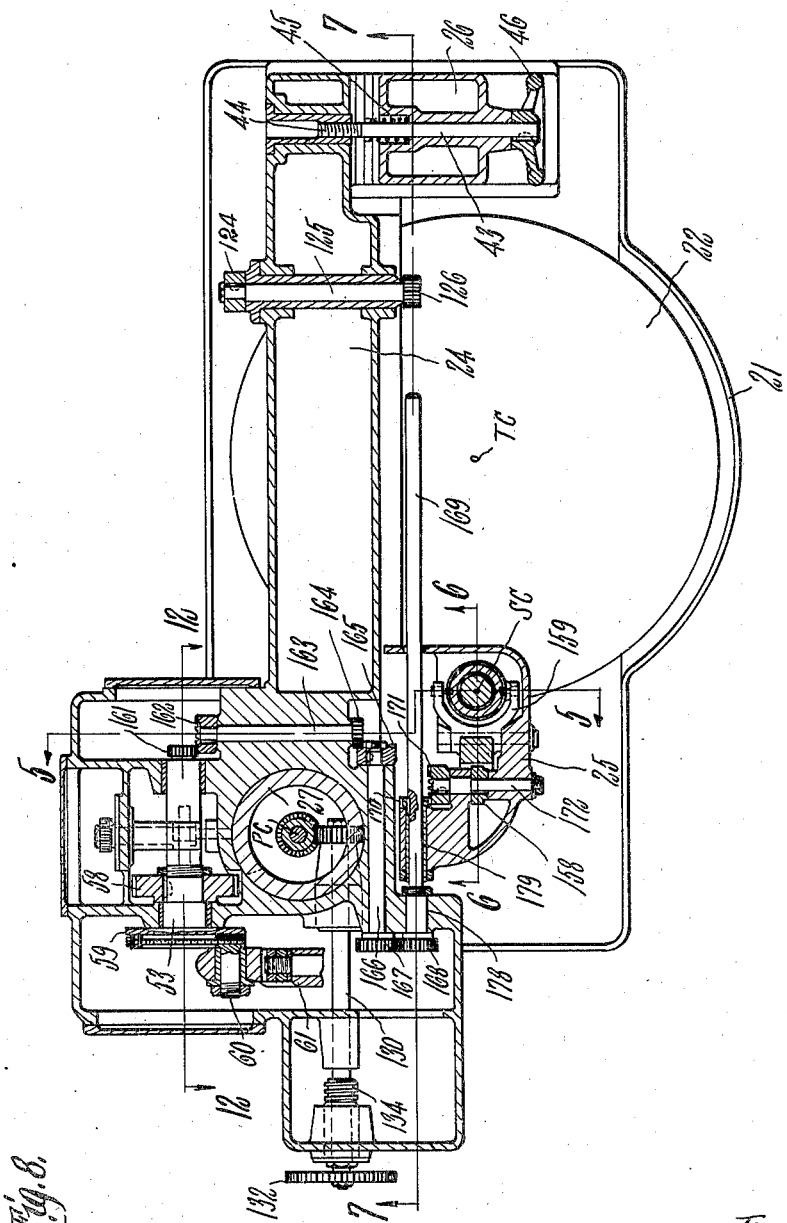

Aug. 9, 1938.  E. W. MILLER  2,126,339
GEAR SHAPING MACHINE WITH SWIVELED CUTTER SADDLE SUPPORT
Filed Oct. 24, 1936  8 Sheets-Sheet 7
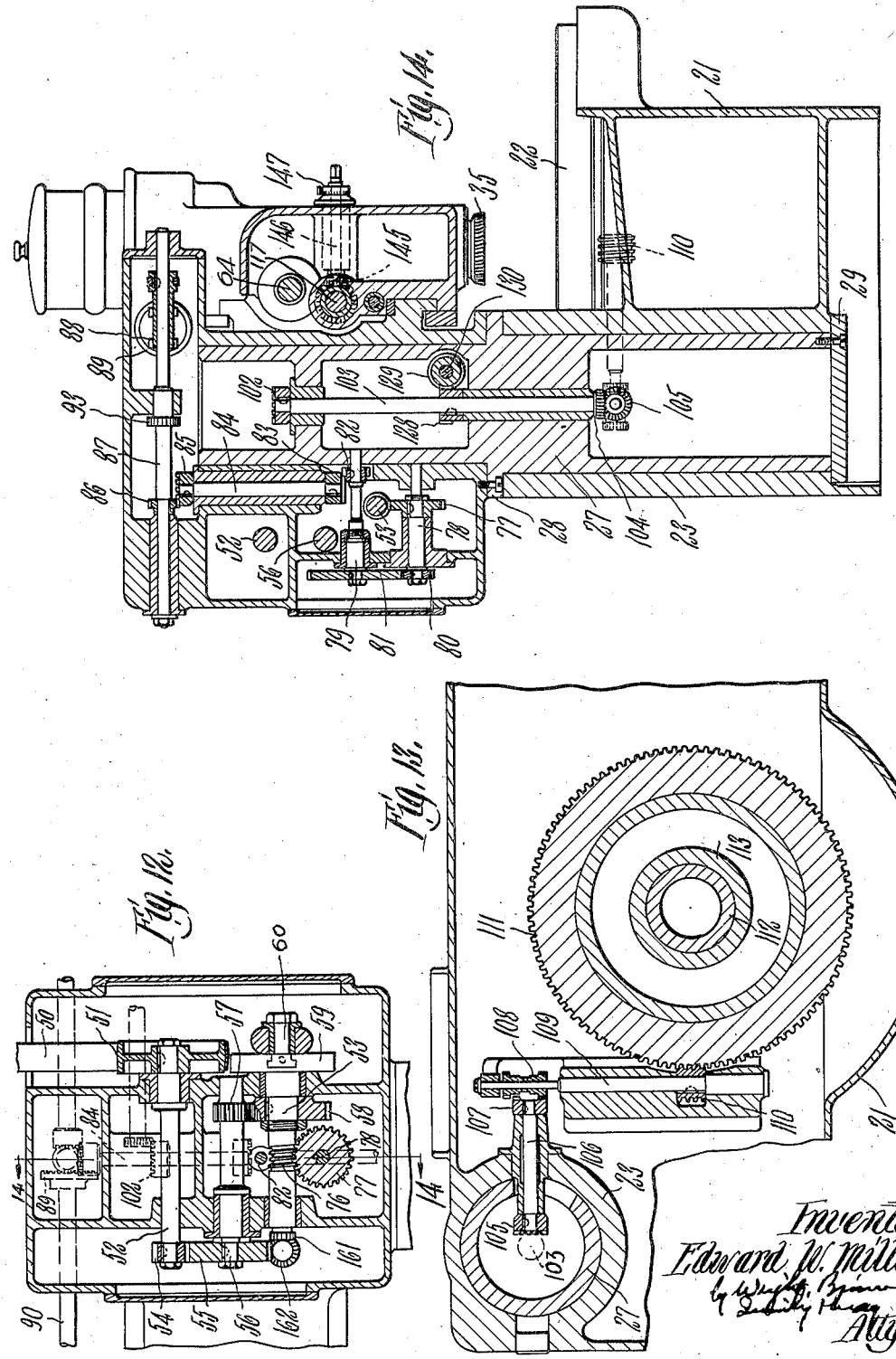

Aug. 9, 1938.  E. W. MILLER  2,126,339
GEAR SHAPING MACHINE WITH SWIVELED CUTTER SADDLE SUPPORT
Filed Oct. 24, 1936  8 Sheets-Sheet 8

Inventor
Edward W. Miller

Patented Aug. 9, 1938

2,126,339

UNITED STATES PATENT OFFICE 2,126,339

GEAR SHAPING MACHINE WITH SWIVELED CUTTER SADDLE SUPPORT

Edward W. Miller, Springfield, Vt., assignor to The Fellows Gear Shaper Company, Springfield, Vt., a corporation of Vermont Application October 24, 1936, Serial No. 107,408

18 Claims. (Cl. 90—9)

This invention relates to the art of generating gears by the well known shaping process according to which a gear-like cutter with cutting edges at one end is reciprocated across the zone of the work piece in which teeth are to be cut, while both the cutter and work are rotated about their respective axes in directions and at speeds corresponding to those of gears of like diameters running in mesh together. More particularly it relates to machines operating according to this principle and adapted to cut original teeth in previously blank work pieces. Its primary object is to provide in one machine capacity for producing gears, both external and internal, of large dimensions and a much wider range of diameters than has been possible heretofore. Other objects, related to the foregoing, are to combine means for rigidly supporting the cutter and cutter spindle against deflection in all of its possible operating positions, with provisions for displacement of the cutter spindle support so that work pieces, including such as are too large and heavy to be handled manually, can be conveniently put in operating position and removed; and to organize driving mechanism for the cutter spindle and work holder in a manner to permit displacement of the cutter spindle support for placement and removal of work pieces without disconnecting or deranging such mechanism.

In the accomplishment of these objects I have provided as a part of the fundamental machine structure an arm angularly movable from a position over the work table to a position aside therefrom, on which arm the cutter carriage or saddle is supported and guided for depth feed movements and for adjustment to work pieces of different dimensions, and have provided rigid positioning and auxiliary supporting means for such arm when in the working location over the work table. I have also provided a complete train of operating mechanism for giving the necessary relative cutting and generating movements to the cutter spindle and work holder, including a sufficiency of changeable and reversible driving elements to produce external or internal gears of all dimensions within the range of the machine, with straight or helical teeth of either hand; such mechanism being in large part carried by the swinging structure, and including a transmission member concentric with the pivotal axis of such structure, by which motion is transmitted to the work table.

The following specification describes, with reference to the accompanying drawings, the details of a concrete machine embodying the principles of this invention in a satisfactory form.

In the drawings,—

Fig. 1 is a front elevation of the machine referred to;

Fig. 2 is an end elevation of the right hand end of the machine as seen from the right of Fig. 1;

Fig. 3 is a plan view of the machine;

Fig. 4 is an elevation of a pneumatic spring device by which the depth feed of the cutter is in part controlled, such device being cut from the machine on line 4—4 of Fig. 3;

Fig. 5 is a cross section of the machine taken on line 5—5 of Figs. 1 and 3;

Fig. 6 is a sectional view on a larger scale of the cutter carriage or saddle and parts within the same, taken on line 6—6 of Fig. 5;

Fig. 7 is a longitudinal section of the machine taken on line 7—7 of Figs. 3 and 8;

Fig. 8 is a sectional plan view of the parts below the line 8—8 of Fig. 7;

Fig. 9 is a left hand end view of the machine as seen when the plates which normally cover parts of the mechanism have been removed;

Figure 15:
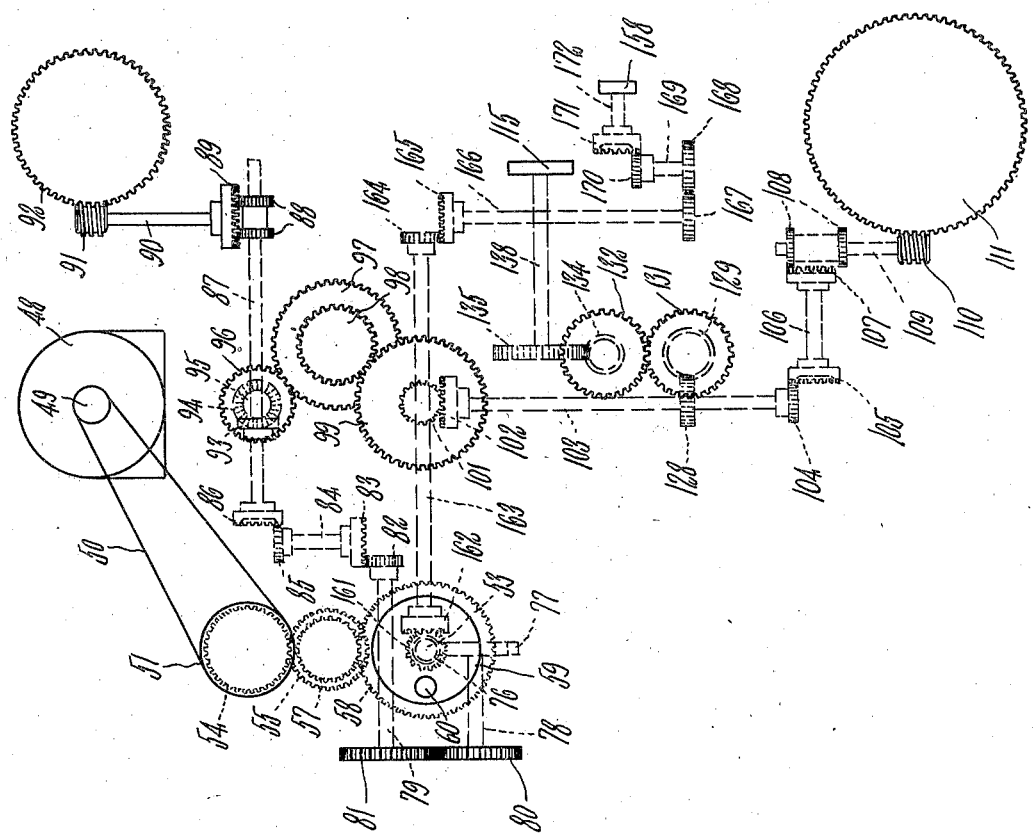

Figs. 10 and 11 are sectional views taken on lines 10—10 and 11—11 respectively of Figs. 1 and 7;

Fig. 12 is a sectional view of the parts cut by line 12—12 of Fig. 3 when seen from the rear of the machine;

Fig. 13 is a sectional plan of the parts below section line 13—13 of Figs. 1 and 7;

Fig. 14 is a cross section of the machine on line 14—14 of Figs. 1, 7 and 12;

Fig. 15 is a diagram of the driving and transmission mechanism.

Like reference characters designate the same parts wherever they occur in all the figures.

The fundamental structure of the machine comprises a base 21 supporting rotatably a work holding table 22, a column or post 23 rising from the base near one end thereof, an angularly adjustable arm 24, which supports and guides the adjustable cutter saddle or casing 25 and is generally referred to hereinafter as the "guide arm" or the "supporting arm", swiveled on said post, and a bracket 26 rising from the base at the opposite end thereof from column 23, by which the free end of the guide arm is supported and confined immovably in a definite position during the operation of the machine.

The guide arm 24 is of box construction; and housings containing the trains of mechanism presently described are structurally connected with it. This combined arm and housing structure is secured to a massive and rigid hollow pivot 27, (see particularly Fig. 14), which is fitted rotatably within the bore of the tubular post or column 23. Such pivot is formed with a flange 28 which rests on the upper end of the column, and its length extends thence upward throughout the height of the combined arm and housing structure, and downward through the tubular post to near the bottom of the base. A thrust plate 29 underlying an annular shoulder at the lower end of the column is secured to the lower extremity of the pivot for securing it against upward displacement resulting from the working thrust of the cutter.

The guide arm 24 is formed with guideways 30 and 31 on its forward side, to which the rear side of the cutter saddle 25 is fitted, and on which the latter is retained slidingly by gibs 32 and 33, (Fig. 5). A cutter spindle 34 is mounted to rotate and reciprocate in the saddle and carries on its lower protruding end a gear shaper cutter 35. Such cutter is of the well known type illustrated by prior patents of Edwin R. Fellows, having peripheral teeth with outlines similar to conventional gear teeth and cutting edges at the lower ends of such teeth, that is, the under side of the cutter as here represented.

The work table 22 is of large diameter and is adapted to support work pieces W (Fig. 1) ranging in diameter from a maximum nearly or approximately as large in diameter as the table, to any practicable minimum diameter. While no means are shown here for securing such work pieces to the table, it will be understood that any of the familiar means known to the art, such as clamps, or mandrels or arbors, a chuck, etc., may be used for this purpose. Such details are unimportant to the present invention, a vital feature of which is that the organization of the machine enables gears of a much wider range of dimensions to be produced than has been possible heretofore with any single machine.

An important means for accomplishing this result is the provision of a long guide, such as the arm 24, on which the cutter saddle may be mounted to bring the cutter to either side of the work table center TC and into any position between such center and a location over either opposite limb of the table; coupled with provisions for displacing such guide to one side of the table so as to leave room for the placement and removal of large work pieces, including those which are so massive and heavy that mechanical aids are required to handle them. The provision for swinging the guide arm aside consists essentially in the pivot mounting just described. The pivot axis is vertical, and the arrangement is such that the arm may be swung to any distance sufficient to clear, and to carry the cutter clear of, the space above the work piece. When in operating position, the arm extends over the table in a location which brings its guideways parallel to the line of centers TC—SC of the table and cutter spindle. In this location the outer or free end of the arm is supported by the bracket 26. An open notch 36 is provided in the rear side of the bracket, as shown in Fig. 2, to receive the extremity of the arm, and the walls of the notch are lined with wear resistant abutment plates 37, 37, 38 and 39. Cooperating abutment plates 40, 40 41 and 42 are secured to the arm extremity and are of suitable thickness to effect an accurate close sliding fit of the arm within the notch and to locate the arm at the exact predetermined distance from the work table axis. Not only is the arm supported by the lower side of the notch, but it is withheld by the upper side from being lifted by the reaction of the cutter during the working strokes of the latter.

The guide arm is clamped in the supporting bracket by a screw shaft 43 rotatably mounted in the bracket and having a threaded rear extremity which enters an internally threaded sleeve 44 and meshes with the threads thereof. This shaft is slidable endwise in the bracket against the resistance of a spring 45 (Fig. 8) which tends to project it rearwardly to the limit permitted by the hand wheel 46 which is secured to its outer end. Hence when the arm enters the notch, it displaces the screw shaft until the threaded sleeve comes into axial alinement with the screw, and the spring constantly presses the screw against this sleeve so that, as soon as the hand wheel is rotated, the screw meshes with the threads of the sleeve. This feature is of considerable practical utility by reason of the assistance it gives the machine attendant in clamping the arm. The attendant needs only to turn the hand wheel after the arm has been passed fully into the notch. He need not push the screw shaft endwise at the same time nor make any effort to find the threaded passage with the end of the shaft.

Swinging of the arm between working and displaced positions may be performed manually. The operating mechanisms for the cutter spindle are disposed, and their housings and bearings so connected with the arm, as largely to counterbalance the weight leverage of the arm and of the cutter saddle, whereby the friction and binding effect of the pivot 27 and the tubular post 23 are reduced to the minimum. The large diameter and great length of these parts also contribute to the same end. In order that deflection either upward or downward of the unsupported end of the arm may not obstruct its entrance into the notch, the abutment plates 38, 41 and 39, 42 are complementally beveled at their ends, as shown in Fig. 2.

Power for driving the entire machine is derived from an electric motor 48 mounted on the top of the composite arm structure at the opposite side of the pivot axis PC from the cutter saddle. The motor, by means of a belt and pulley or sprocket and chain transmission 49, 50, 51, drives a shaft 52 from which rotation is transmitted to a crank shaft 53 by change gears 54, 55, distinctively designated as "stroke gears", an intermediate shaft 56, a pinion 57 and a gear 58, as best shown in Fig. 12. Shaft 53 carries a crank disk 59 in the outer face of which is a diametral slot containing a crank pin 60 (see also Fig. 11), which is adjustable radially of the crank disk in a well known manner to vary the stroke of the cutter. The connecting rod 61 is coupled to the crank pin and carries a rack 62 which meshes with a gear 63 on a rock shaft 64. This rack comprises teeth cut in one side of a sleeve in screw threaded engagement with an extension rod 65 having a rotative engagement with the connecting rod 61 and being prevented from moving endwise relatively to the latter by abutments 66 and 67, the latter of which is in screw threaded connection with the extension rod. The rack sleeve 62 is fitted slidingly in a tubular guide 68 which has lugs on opposite sides of gear 63 through which the rock shaft passes (Fig. 7).

The rock shaft 64 is fittted to bearings in a housing 69 (Fig. 7) secured to the guide arm. It extends through the cutter saddle nearly to the farther end of the guide arm. This latter part of the rock shaft is coextensive with the range of adjustment and feed movement of the cutter saddle and is provided with continuous external gear teeth 70 which mesh with rack teeth 71 on one side of a sleeve 72 which fits slidingly and is movable endwise in a bushing 73 in the cutter saddle. Such sleeve surrounds the cutter spindle 34, and is coupled with it by end thrust bearings 74 and 75 so as to transmit endwise movement to the spindle in both directions. The provision for adjustment of the rack sleeve 62 with respect to the connecting rod 61 enables the spindle to be shifted independently of rotation of the crank pin 60, and thus adjusts the limits of the stroke of the cutter without changing the length of the stroke, which is governed by adjustment of the crank pin.

The cutter spindle and work table are rotated in harmony with one another by the following mechanism. A worm 76 on crank shaft 53 (Figs. 12 and 14) meshes with a worm wheel 77 on a shaft 78. The latter drives a shaft 79 through change gears 80 and 81 descriptively called "rotary feed gears". Shaft 79 carries a gear 82 meshing with crown gear 83 on an upright shaft 84 which carries a crown gear 85 meshing with pinion 86 on shaft 87. A sliding double pinion 88 splined to the latter shaft is adapted to mesh with a crown gear 89, at either side of the axis of the latter, whereby to transmit rotation in either direction. Gear 89 is keyed to a shaft 90 on which is splined a worm 91 fitted rotatably in a housing on the cutter saddle and meshing with a worm gear 92, (the so called cutter index wheel), which is rotatably mounted in the cutter saddle coaxial with the cutter spindle, (Figs. 5 and 6).

A pinion 93 on shaft 87 (Fig. 14) meshes with a crown gear 94 on a shaft 95, (Fig. 7). The latter shaft carries the member 96 of a train of change gears 96, 97, 98, 99, (referred to as "work change gears"), of which the one last named is secured to a shaft 100 on which there is a pinion 101 meshing with a crown gear 102 on an upright shaft 103 coaxial with the axis PC of the pivot. The latter shaft is mounted in bearings in the pivot 27, as shown by Fig. 14, and carries on its lower end a pinion 104 in mesh with a crown gear 105 (Fig. 13) on a shaft 106 which also carries a crown gear 107 adapted to mesh, at either side of its axis, with a shiftable double pinion 108 splined to worm shaft 109 which carries a worm 110 in mesh with a worm wheel 111 (the so called index gear of the work table), which is secured to the work table substantially as shown in Fig. 7. It may be noted that the work table has a tubular pivot 112 fitted to a bearing 113 in the base and constructed to receive an arbor or equivalent means for centering and securing the work pieces. The table rests on a finished annular seating surface 113a on the upper side of the base.

It will be appreciated from the foregoing description that by means of the shiftable pinions 88 and 108, the direction of rotation of either the cutter or the work may be reversed independently of the other for cutting either external or internal gears with straight or helical teeth of either right hand or left hand helix. A shifter 114 (Fig. 3) projecting from the front of the machine and coupled with the pinion 88 serves for thus reversing the spindle drive. A corresponding shifter, not shown, is coupled with the pinion 108 for bringing one part or the other into mesh with gear 107. By changing the rotary feed gears 80, 81 and the work change gears 96—99, the rotational speed of the cutter spindle and work holder relatively to the reciprocations of the cutter spindle, and the speed ratio of the cutter spindle and work holder to one another, respectively, may be made of any desired values within a wide range. The transmission shaft 103 located in the pivot axis maintains continuous connection between the cutter and work holder, so far as concerns their rotational movement, in all positions of the guide arm about this axis.

The cutter of this machine commences its operation at the circumference of the work piece (external or internal circumference according as the work is an external or internal gear) and is gradually fed radially of the work piece until its teeth have penetrated to the prescribed depth into the work. The machine is equipped with a depth feed which accomplishes such advance of the cutter automatically simultaneously with its cutting and generating motion. The means for this purpose comprises a depth feed cam 115 (Fig. 7), which acts on a roll 116 carried by the adjacent end of an endwise movable rod or bar 117 which is engaged with the cutter saddle in a manner presently described and is supported in bearings 118 and 119 in the guide arm and associated housing structure. A key 120 prevents this rod from rotating. The rod is yieldingly urged toward the cam, and its follower roll held in contact with the periphery of the cam, by a pneumatic spring device consisting of a cylinder 121 (Figs. 3 and 4) containing compressed air or to which air under pressure is constantly supplied. A piston fitting within such cylinder is coupled through its piston rod 122, a link 123 and an arm 124, with a shaft 125 (Fig. 8) on which is a pinion 126 in mesh with rack teeth 127 on the rod.

Depth feed cam 115 is driven from the shaft 103 by a helical gear 128 thereon, a meshing driven gear 129 on a horizontal shaft 130, change gears 131 and 132 (called "depth feed change gears") on this shaft and on a shaft 133 respectively, a worm 134 on shaft 133, a mating worm gear 135, a pawl 136 and a ratchet wheel 137. The gear 135 is loosely mounted on, and ratchet 137 keyed to, the shaft 138 to which the depth feed cam is secured. The pawl and ratchet constitute a one way clutch which transmits the automatic drive to the depth feed cam but permits the cam to be manually advanced by a shaft 139, to which a wrench may be applied. Such shaft is connected with the depth feed cam shaft by a gear pair 140—141, (Fig. 10). As will be seen in Fig. 7, the depth feed cam has a rise in a small part of its circumference, a dwell throughout the major part of its circumference and a quick drop through the remainder. It is rotated at an angular speed enough slower than the work table to permit at least one complete rotation of the latter after the cutter has been fed to full depth and before the cutter is withdrawn by the arrival of the cam drop beside the follower roll. By appropriate selection of the change gears 131, 132, the cam may be appropriately correlated to cutters and work pieces of different diameters and numbers of teeth.

The depth feed transmission bar 117 is also a means for adjusting the position of the cutter to work pieces of different diameters. For that purpose it is screw threaded through the major part of its length and meshes with internal threads in a sleeve 142 contained rotatably and withheld from endwise movement in a bearing 143 of the cutter saddle. This sleeve has crown gear teeth 144 on one end meshing with a pinion 145, (Fig. 14), on a shaft 146 which extends to the front of the machine, where it carries a graduated collar 147 and is adapted to receive a wrench for turning it.

The cutter is slightly withdrawn or backed off from the work after each cutting stroke so that its cutting edges will not rub on the work during its return strokes. To permit such withdrawal movement, the cutter spindle guides 148, 149 are connected with the index worm wheel 92 by means of ball and socket members 150, 151, 152 and radial pins 153 which permit the spindle to swing about the center A of the ball. A clearance wide enough to permit ample backing off movement of the cutter is provided between the rack sleeve 72 and that part of the spindle which passes through the sleeve, and the thrust bearings 74 and 75 act through washers 154 and 155 mounted on the sleeve. The contact faces of bearing 74 and washer 154, and likewise of bearing 75 and washer 155, are spherical segments concentric with the center A. The spindle is centered while cutting by a sleeve 156, fitted slidingly on the spindle and having external beveled faces fitted to complemental internal faces in a bushing 157, which sleeve is reciprocated by a cam 158 acting through a forked lever 159. The cam holds the sleeve in forcible engagement with the bushing throughout the cutting strokes, and causes withdrawal of the cone sleeve at the end of each cutting stroke, whereupon the operative one of two or more interchangeable spring pressed plungers 160 swings the lower end of the spindle and the cutter away from the contiguous part of the work piece.

This cutter relieving means is fully explained in a pending application filed by me July 21, 1936, Serial No. 91,665, and hence requires no further description here. The complete driving train for the relieving cam is, however, not shown in said application but is shown here. It consists of a pinion 161 on the crank shaft or main shaft 53, a crown gear 162, (Figs. 8 and 12), on a shaft 163, a pinion and crown gear couple 164, 165, shaft 166, gear pair 167, 168, a shaft 169 (descriptively called the back off shaft), a pinion 170 on the latter shaft, and a meshing crown gear 171 on the shaft 172 to which the back off cam 158 is secured. The pinion 170 is mounted rotatably in a bearing in the cutter saddle and is splined to shaft 169.

It will be observed that the upper worm shaft 90, the toothed portion 70 of rock shaft 64, the screw threaded depth feed rod 117 and the back off shaft 169 all extend in parallel with the guide arm 24 to a length sufficient to maintain operative engagement with the associated parts in the cutter saddle throughout the entire range of adjustment of the saddle along the arm. Such range of adjustment is wide enough to put the cutter in cooperative relation to the largest external gear blank within the capacity of the machine, at the left hand side of the work table axis, or with the largest internal gear at the right hand side of such axis, and with all external or internal gears of smaller diameters.

The construction of the machine combines ample rigidity with capacity for swinging the cutter support aside. This follows from the fact that when in operating position, the guide arm 24 is a beam solidly supported and confined at both ends, and that the work table rests on a rigid base. Contributory to the same effect is that the effect of relieving the cutter on its nonworking strokes is obtained by swinging the cutter spindle, and not by displacing the work holder bodily, as has been done with some of the previously patented machines. By confining the backing off movement to the cutter spindle independently of the cutter saddle, the withdrawal and return at the end of each stroke are effected with the minimum of power expenditure and of vibration due to the rapid reversal of reciprocating parts.

Accuracy of movement of the cutter spindle, and freedom from backlash in its driving and propelling mechanisms, are effectively safeguarded notwithstanding that the shafts 90, 64 and 169 are unsupported at their outer ends. The worm 91 is fitted rotatably and held against endwise movement in a bearing 173 in the cutter saddle which is axially alined with a bearing 174 for the worm shaft in the housing structure. The rock shaft 64 is confined in bearings 175 and 176 in the housing structure at opposite sides of its torque receiving gear 63, and its toothed portion is surrounded by bushings 177 in the cutter saddle at respectively opposite sides of the cutter spindle rack teeth 71, the outer circumference of the rock shaft teeth being in bearing engagement with the inside surface of such bushings. The back off shaft is confined in accurately alined bearings 178 and 179 in the housing structure and saddle respectively.

Straight toothed gears, or helical gears of either hand and any helix angle are produced by the cooperation of the spindle guides 148, 149, and the appropriate selection of interchangeable guides. These guides are of the type familiar in gear shaping machines. They comprise a member which is secured to the spindle and a cooperating member or members connected to the index wheel. They have abutting surfaces which are parallel to the axis of the spindle for producing straight toothed gears, and are helicoidal with an angle and direction corresponding to the teeth of the cutter and the teeth to be generated when helical gears are made. In the illustrated embodiment the guide 148, as shown in Figs. 5 and 6, is clamped by a nut to the tapered upper extremity of the cutter spindle, and the complemental guide 149, which may consist of two members relatively adjustable to take up wear, is secured to a sleeve 180 which is detachably fitted and secured within the ball member 151 of the ball and socket joint between the spindle and the index wheel.

Although in the machine here illustrated the axes of the work holder, the cutter spindle and the pivot on which the cutter saddle support is mounted are all vertical, and the guide arm is horizontal, the principles of the invention are not necessarily limited to this arrangement. It is the preferred arrangement, but I claim protection for all other possible arrangements embodying the essential principles of the invention, as well as all substantial equivalents for the specific structures and mechanisms here illustrated.

What I claim and desire to secure by Letters Patent is:

1. A gear shaping machine comprising a base, a work holder rotatably mounted on the base, an arm swiveled to the base above said work holder in a position enabling it to be swung over and aside from the work holder, a cutter saddle mounted on said arm with capacity for adjustment to different positions along the arm, and a cutter spindle rotatably and reciprocably mounted in said saddle and adapted to carry a gear shaper cutter for generating teeth in gear blanks secured to said work holder; the arm having guideways with which the saddle is engaged, of suitable length and suitably positioned to permit location of the cutter spindle at points variously distant from and on either side of the work holder axis.

2. A gear shaping machine comprising a base having a post at one end and a bracket at the opposite end, a work holder rotatably mounted on the base intermediate said post and said bracket, an arm swiveled to said post above the base adapted to be supported adjacent to its opposite end by said bracket and being angularly movable about the axis of the post to one side of the space above the work holder, a cutter carriage supported by said arm in guided engagement therewith for adjustment lengthwise of the arm, and a cutter spindle reciprocably and rotatably mounted in said carriage and adapted to operate a gear shaper cutter in cutting and generating relation with a gear blank carried by said work holder.

3. A gear shaping machine comprising a base, a work table rotatably mounted on said base and restrained from all movement other than rotation about a single axis, a post rising from the base at one side of the table, an arm having a horizontal guideway supported by said post in pivotal connection therewith, a cutter saddle supported by said guideway with capacity for movement longitudinally thereof, a cutter spindle mounted in said saddle with provision for rotation and reciprocation lengthwise of its axis of rotation in a line parallel to the axis of the work table, and a supporting stop for said arm mounted on the base in a position to hold the arm rigidly when the latter is placed so as to overlie a portion of the work table, the arm being movable about its pivot axis far enough to leave a clear space above the table for placement and removal of work pieces.

4. A gear shaping machine comprising a base, a work table supported rotatably on said base, an arm swiveled to the base above the work table movable about its swivel axis across and aside from the table and having a horizontal guideway in that portion which is adapted to extend over the table, a cutter saddle supported on and movable along said guideway, a cutter spindle reciprocably and rotatably mounted in said saddle with its axis of rotation parallel to the axis of the work table, and means for supporting and securing the outer end of said arm in a position such that the said guideway and the line of centers of the cutter spindle and work table are parallel to each other.

5. In a gear shaping machine of the type employing a gear-like cutter and having relatively rotatable and axially movable cutter spindle and work holder, and a saddle or carriage for the cutter spindle, a swiveled arm on which such carriage is mounted, said arm being movable aside from the work holder and into a position which places the cutter spindle in working relationship to the work holder, and said saddle or carriage being adjustable along said arm to positions more or less remote from the work holder axis.

6. A gear shaping machine as set forth in claim 5, and in which the provision for such adjustment is extensive enough to permit placement of the cutter spindle at either side of the work holder axis for generation of either external or internal gears.

7. In a gear shaping machine as set forth in claim 5, the combination with the parts therein claimed of a rigid support adapted to secure the free end of said swiveled arm in the working position.

8. A gear shaping machine comprising a base, a combined guide arm and housing structure swiveled to said base, a cutter saddle mounted on said arm and movable lengthwise thereof toward and away from the swivel axis of the arm, a cutter spindle movable endwise and rotatably in said saddle, driving mechanism carried by said combined structure and including mechanisms organized to impart the said movements to the cutter spindle, a work holder rotatably mounted on the base, and mechanism for rotating said work holder including a shaft coaxial with the swivel of said arm and in torque-receiving connection with a portion of the precedently named mechanism.

9. In a gear shaping machine, a base structure including a fixed bracket having a locating notch open at one side, an arm swiveled to said base in a manner permitting its free end to enter and leave such locating notch, a screw mounted rotatably and with provision for endwise movement in said bracket projecting from the closed toward the open side of the notch, and a yieldable impeller acting on said screw in the same direction and arranged to permit yieldingly resisted endwise withdrawal of the screw, said arm having a threaded aperture complemental to the screw and located to be placed in alinement with the screw when the arm is entered into the locating notch.

10. A gear shaping machine comprising a base, an arm adapted to support a cutter spindle holder swiveled to said base, a bracket on the base having a seat adapted to receive and hold the free end of said arm, means associated with the bracket and arm for rigidly holding the latter in seated engagement with the bracket, and a work holder supported on the base in position to hold work pieces in operative relationship to a cutter spindle carried by said arm when the arm is in seated engagement with the bracket.

11. In a gear shaping machine as set forth in claim 10, the combination with the parts there claimed, of a cutter carriage slidingly mounted on the arm, a cutter spindle reciprocatively and rotatably mounted in said carriage, means for adjusting said carriage along the arm, means including a portion of said adjusting means for giving a progressive depth feed to the carriage during the working cycle of the machine, and mechanism for respectively reciprocating and rotating said spindle in all positions of the same lengthwise of the arm.

12. A gear shaping machine comprising a base, an arm, a pivotal connection between said base and arm permitting angular movement of the arm about a fixed axis, a cutter carriage supported by the arm and engaged therewith in a manner permitting adjustment lengthwise of the arm, a cutter spindle mounted to rotate and reciprocate axially in said carriage, a motor mounted on the arm, transmission mechanisms also mounted on the arm and driven by said motor for respectively rotating and reciprocating the spindle, said mechanisms including rotatable shafts in sliding engagement with parts of the carriage, a work holder rotatably mounted on the base, a shaft coaxial with the pivot axis of the arm in driven connection with the precedently described mechanism, and rotation transmitting means between said coaxial shaft and the work holder.

13. In a gear shaping machine, a base, a guide arm pivoted to the base to turn about an axis transverse to its length, a cutter carriage mounted on said arm and in guided longitudinally adjustable connection therewith, a cutter spindle rotatably and reciprocably mounted in said carriage adapted to hold a gear shaper cutter at or near one of its ends, rotation transmitting means coupled to said spindle at a point remote from its cutter carrying portion, the coupling between said rotation transmitting means and spindle being constructed to permit swinging movement of the spindle transversely of its axis, a reciprocable element movable in the direction of the axis of the spindle, thrust transmitting means between said element and spindle including slidable contact surfaces arranged to permit said swinging movement of the spindle independently of said reciprocable element, mechanism for reciprocating the reciprocable element, mechanism for rotating said rotation transmitting means, and means for causing back and forth swinging movement of the spindle at predetermined points in the opposite reciprocations thereof.

14. A gear shaping machine as set forth in claim 13, comprising further a power delivering means mounted on said arm, and mechanism also mounted on said arm for driving respectively the rotation transmitting means, the reciprocable element and the backing off means.

15. A gear shaping machine as set forth in claim 13, comprising further a power delivering means mounted on said arm, and mechanism also mounted on said arm for driving respectively the rotation transmitting means, the reciprocable element and the backing off means, said mechanism including shafts parallel with the path in which the carriage is adjustable on the guide arm, said shafts being in sliding connection with the rotation transmitting means, the reciprocable element and the backing off means respectively.

16. A gear shaping machine comprising a base, a laterally movable guide arm in pivoted connection with the base, a cutter carriage slidably mounted on the arm, a cutter spindle reciprocably and rotatably mounted in said carriage, a work holder rotatably mounted on the base, and mechanism for rotating said spindle and work holder in correlation with one another including a transmission element coaxial with the pivot of the arm.

17. In a gear generating machine, the combination with a supporting structure having a guide arm, of a cutter saddle slidably supported on said arm and shiftable along the same into different working positions, a spindle mounted to reciprocate endwise in said saddle, and means for reciprocating the same comprising a rack element connected to and extending longitudinally of said spindle, a shaft having an elongated gear extending lengthwise of the arm and in mesh with said rack element, a main shaft on the supporting structure having a crank, a connecting rod engaged with said crank, a rack rigidly coupled with said connecting rod, and a gear connected to the first named shaft and in mesh with the last named rack, said rack being adjustable lengthwise of the connecting rod for adjusting the limits of the reciprocating movement of the spindle.

18. In a gear shaping machine of the character described having an endwise reciprocable spindle, a shaft in geared engagement with said spindle for reciprocating it, a gear on said shaft, a main driving shaft having a crank, a connecting rod coupled to said crank and having a rotatably mounted extension rod, and a rack in screw threaded connection with said extension rod and in mesh with said gear, rotation of the extension rod causing endwise adjustment of the rack for adjusting the location of the spindle.

EDWARD W. MILLER.